(12) United States Patent
Yamaguchi

(10) Patent No.: US 10,850,764 B2
(45) Date of Patent: Dec. 1, 2020

(54) BALL SCREW DEVICE, METHOD OF MANUFACTURING BALL SCREW DEVICE, AND STEERING SYSTEM INCLUDING BALL SCREW DEVICE

(71) Applicant: JTEKT CORPORATION, Osaka (JP)

(72) Inventor: Masashi Yamaguchi, Toyota (JP)

(73) Assignee: JTEKT CORPORATION, Osaka (JP)

( * ) Notice: Subject to any disclaimer, the term of this patent is extended or adjusted under 35 U.S.C. 154(b) by 247 days.

(21) Appl. No.: 16/107,029

(22) Filed: Aug. 21, 2018

(65) Prior Publication Data

US 2019/0061806 A1 Feb. 28, 2019

(30) Foreign Application Priority Data

Aug. 28, 2017 (JP) ................. 2017-163172

(51) Int. Cl.
*B62D 5/04* (2006.01)
*B62D 5/22* (2006.01)
*B62D 3/12* (2006.01)
*B62D 1/16* (2006.01)
*F16H 25/22* (2006.01)
(Continued)

(52) U.S. Cl.
CPC .......... *B62D 5/0448* (2013.01); *B62D 1/166* (2013.01); *B62D 3/126* (2013.01); *B62D 5/22* (2013.01); *F16H 25/2204* (2013.01); *F16H 25/2214* (2013.01); *F16H 25/2233* (2013.01);
(Continued)

(58) Field of Classification Search
CPC ...... B62D 5/0448; B62D 5/0445; B62D 5/22; B62D 1/126; B62D 1/166; F16H 25/2204; F16H 25/2233
See application file for complete search history.

(56) References Cited

U.S. PATENT DOCUMENTS 6,454,042 B1 * 9/2002 Yoshida ............... B62D 5/0448
180/444
6,499,374 B1 12/2002 Ohga
(Continued)

FOREIGN PATENT DOCUMENTS

JP H11-11334 A 1/1999
JP 3019253 B2 3/2000

OTHER PUBLICATIONS

Feb. 13, 2019 extended European Search Report issued in European Patent Application No. 18190721.3.

*Primary Examiner* — Tony H Winner
(74) *Attorney, Agent, or Firm* — Oliff PLC

(57) ABSTRACT

In a ball screw device, an inner peripheral rolling groove of a nut includes, between openings of mounting holes, a constant pitch circle diameter region where a pitch circle diameter is constant and gradually-changing pitch circle diameter regions where the pitch circle diameter gradually increases, in the ranges from opposite ends of the constant pitch circle diameter region to the respective openings. At least the constant pitch circle diameter region has a surface hardness greater than or equal to a predetermined value, among the constant pitch circle diameter region and the gradually-changing pitch circle diameter regions excluding edges at the boundaries between the respective openings and the inner peripheral rolling groove, and the edges at the boundaries between the respective openings and the inner peripheral rolling groove have a surface hardness less than the predetermined value.

5 Claims, 9 Drawing Sheets

(51) Int. Cl.
*F16H 25/20* (2006.01)
*F16H 25/24* (2006.01)

(52) U.S. Cl.
CPC ............. *F16H 2025/2081* (2013.01); *F16H 2025/2242* (2013.01); *F16H 2025/2481* (2013.01)

(56) References Cited

U.S. PATENT DOCUMENTS

| | | | |
|---|---|---|---|
| 2011/0296939 A1* | 12/2011 | Kaneko | B62D 5/0448 |
| | | | 74/424.87 |
| 2012/0031211 A1 | 2/2012 | Uchida et al. | |
| 2015/0060188 A1* | 3/2015 | Kitamura | B21K 1/64 |
| | | | 180/444 |
| 2015/0284020 A1* | 10/2015 | Asakura | F16H 25/2223 |
| | | | 180/444 |
| 2018/0306286 A1* | 10/2018 | Illes | F16H 25/2214 |
| 2019/0077445 A1* | 3/2019 | Yoshida | F16H 25/24 |
| 2019/0323586 A1* | 10/2019 | Peric | F16H 25/24 |
| 2020/0122772 A1* | 4/2020 | Suzuki | F16C 25/083 |

* cited by examiner

BALL SCREW DEVICE, METHOD OF MANUFACTURING BALL SCREW DEVICE, AND STEERING SYSTEM INCLUDING BALL SCREW DEVICE

INCORPORATION BY REFERENCE

The disclosure of Japanese Patent Application No. 2017-163172 filed on Aug. 28, 2017 including the specification, drawings and abstract, is incorporated herein by reference in its entirety.

BACKGROUND OF THE INVENTION

1. Field of the Invention

The invention relates to a ball screw device, a method of manufacturing the ball screw device, and a steering system including the ball screw device.

2. Description of the Related Art

There is a ball screw device used for a steering system or the like and having a screw shaft including an outer peripheral surface provided with a helical ball screw groove (outer peripheral rolling groove) and a nut disposed on the outer peripheral side of the screw shaft and having an inner peripheral surface provided with a helical ball screw groove (inner peripheral rolling groove) (see, for example, Japanese Patent Application Publication No. H11-11334). The outer peripheral rolling groove and the inner peripheral rolling groove define a rolling path therebetween where a plurality of balls roll. Deflectors each having a circulation path for endlessly circulating a plurality of balls rolling in the rolling path are attached to the nut. The deflectors are fixed to mounting holes extending between the outer peripheral surface and the inner peripheral surface of the nut.

The balls roll in the rolling path. Therefore, when the balls roll, a stress is applied to the inner peripheral rolling groove with which the balls are in contact. Generally, the inner peripheral rolling groove is heat-treated to improve the durability, so that the groove surface of the inner peripheral rolling groove has a hardness greater than or equal to a predetermined value. A typical heat treatment performed on the inner peripheral rolling groove is a carburizing treatment.

However, a carburizing treatment is costly. Moreover, in a carburizing treatment, a large number of nuts are placed in the furnace and treated in one batch. Therefore, a carburizing treatment is not suitable in the case where one-piece flow for performing a heat treatment on nuts one by one is required when manufacturing nuts. Thus, there is a demand for a heat treatment method that allows one-piece flow and replaces a carburizing treatment. An example of such a heat treatment method is an induction heat treatment (induction hardening) that is low in cost and suitable for one-piece flow. In an induction heat treatment (induction hardening), a coil is disposed on the inner peripheral side of the nut having the inner peripheral rolling groove. Then, a high-frequency current (alternating current) is applied to the coil, so that a magnetic force is generated by electromagnetic induction. Thus, an eddy current is generated on the inner peripheral rolling groove surface near the coil, so that the eddy current heats and hardens the inner peripheral rolling groove surface.

However, the nut has the mounting holes that extend from the outer peripheral surface to the inner peripheral surface to fix the deflectors. The mounting holes are open to the inner peripheral rolling groove. At the positions where the inner peripheral rolling groove surface and the mounting holes meet, edges are formed. Therefore, when a magnetic force is generated by electromagnetic induction in order to perform an induction heat treatment (induction hardening) as an example of a heat treatment, the magnetic flux concentrates at the edges. Thus, the edges might be overheated and melted.

SUMMARY OF THE INVENTION

An object of the invention is to provide a ball screw device in which an inner peripheral rolling groove formed in the inner peripheral surface of a nut is hardened by an inexpensive heat treatment without melting the edges; a method of manufacturing the ball screw device; and a steering system including the ball screw device.

According to an aspect of the present invention, there is provided a ball screw device including: a screw shaft having an outer peripheral surface provided with a helical outer peripheral rolling groove; a nut formed in a tubular shape, having an inner peripheral surface provided with a helical inner peripheral rolling groove, disposed on an outer peripheral side of the screw shaft, and having mounting holes extending between two different single-turn rolling grooves of single-turn rolling grooves aligned in an axial direction thereof and an outer peripheral surface thereof, the inner peripheral rolling groove being defined as a collection of the single-turn rolling grooves aligned in the axial direction and each having a single turn about an axis thereof; rolling elements arranged in a rollable manner in a rolling path defined between the outer peripheral rolling groove and the inner peripheral rolling groove; a return path that short-circuits between openings of the mounting hole which are open to the rolling path and respectively formed in the two different single-turn rolling grooves, and that allows the rolling elements rolling in the rolling path to circulate endlessly; and a deflector that is accommodated and fixed in the mounting hole, that defines a part of or the entire return path therein, and that guides the rolling elements rolling in the rolling path to the return path and returns the rolling elements to the rolling path.

The inner peripheral rolling groove of the nut includes, in a range between the openings of the mounting holes, a constant pitch circle diameter region spaced apart from the openings and formed such that a pitch circle diameter of the rolling path is constant, and gradually-changing pitch circle diameter regions formed such that the pitch circle diameter gradually increases from the constant pitch circle diameter region, in ranges from opposite ends of the constant pitch circle diameter region to the respective openings; and at least the constant pitch circle diameter region has a surface hardness greater than or equal to a predetermined value, among the constant pitch circle diameter region and the gradually-changing pitch circle diameter regions excluding edges at boundaries between the respective openings and the inner peripheral rolling groove, and the edges at the boundaries between the respective openings and the inner peripheral rolling groove have a surface hardness less than the predetermined value.

As described above, in the inner peripheral rolling groove (rolling path), at least the constant pitch circle diameter region to which a stress is applied by the rolling elements rolling therein has a surface hardness greater than or equal to a predetermined value obtained through a heat treatment such as induction hardening. Meanwhile, in the gradually-changing pitch circle diameter regions where a stress applied by the rolling elements is reduced, the edges at the boundaries between the respective openings and the inner peripheral rolling groove do not have a surface hardness greater than or equal to the predetermined value obtained through a heat treatment. With this configuration, in the constant pitch circle diameter region of the inner peripheral rolling groove to which a large stress is applied by the rolling elements rolling therein, since the surface hardness is greater than or equal to the predetermined value, the inner peripheral rolling groove is prevented from wearing.

In the gradually-changing pitch circle diameter regions, a stress applied by the rolling elements rolling therein is reduced. Therefore, even when the surface hardness is not sufficiently increased through a heat treatment, and the surface hardness of the inner peripheral rolling groove is less than the predetermined value, the inner peripheral rolling groove can be prevented from wearing. In this case, the edges at the boundaries between the respective openings and the inner peripheral rolling groove are prevented from being overheated by a heat treatment, so that erosion of the edges where heat is likely to be concentrated is reliably prevented. In this manner, it is possible to manufacture a nut at low cost by appropriately performing an inexpensive heat treatment only on a portion that requires a surface hardness greater than or equal to a predetermined value, without using an expensive carburizing treatment.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
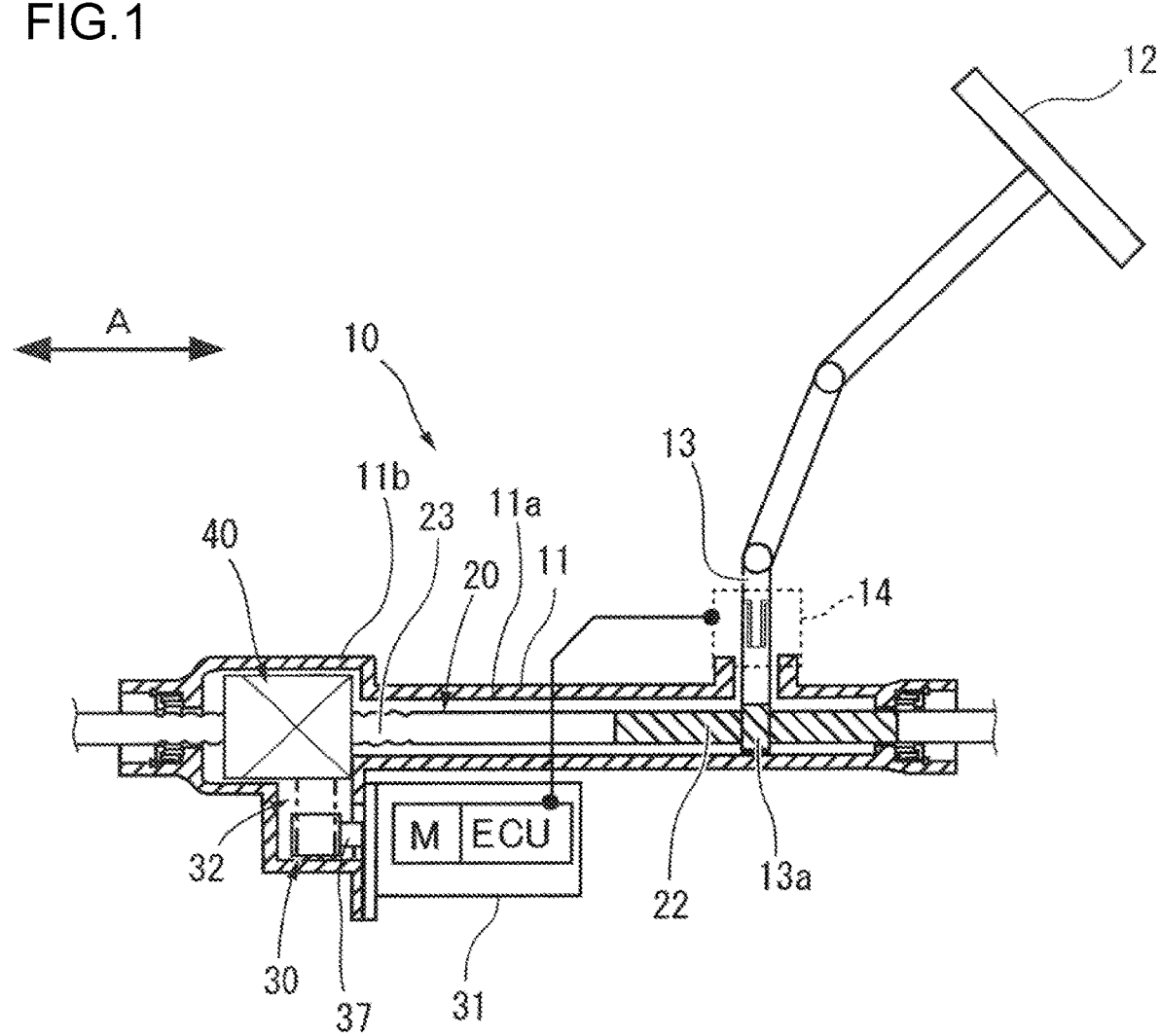
FIG. 1 is a schematic diagram illustrating an electric power steering system according to the present invention.

Hereinafter, a first embodiment of the present invention will be described with reference to the drawings. FIG. 1 is a general view of an electric power steering system, illustrating an aspect in which a ball screw device of the present invention is applied to an electric power steering system (corresponding to a steering system) for a vehicle.

The electric power steering system is a steering system that assists steering by providing a steering assist force. The ball screw device of the present invention may be used not only for an electrical power steering system, but also for various other systems that use a ball screw device, such as a four-wheel steering system, a rear-wheel steering system, and a steer-by-wire system.

The electric power steering system 10 (hereinafter referred to as a "steering system 10") is a system that changes the direction of steered wheels (not illustrated) of a vehicle by reciprocally moving a steered shaft 20 coupled to the steered wheels in a direction A (right-left direction in FIG. 1) that coincides with the axial direction of the steered shaft 20.

As illustrated in FIG. 1, the steering system 10 includes a housing 11, a steering wheel 12, a steering shaft 13, a torque detection device 14, an electric motor M (hereinafter referred to as a "motor M"), the steered shaft 20, a steering assist mechanism 30, and a ball screw device 40.

The housing 11 is a fixed member fixed to the vehicle. The housing 11 is formed in a tubular shape. The steered shaft 20 (corresponding to a screw shaft) is inserted through the housing 11 so as to be relatively movable in the direction A. The housing 11 includes a first housing 11a, and a second housing 11b fixed to an end (left end in FIG. 1) of the first housing 11a in the direction A.

The steering wheel 12 is fixed to an end of the steering shaft 13, and is rotatably supported in the interior of the vehicle. The steering shaft 13 transmits the torque applied to the steering wheel 12 by an operation of the driver to the steered shaft 20.

A pinion 13a is formed at the other end of the steering shaft 13 on the steered shaft 20 side. The pinion 13a forms a rack-and-pinion mechanism. The torque detection device 14 detects torque applied to the steering shaft 13, on the basis of the amount of torsion of the steering shaft 13.

The steered shaft 20 extends in the direction A. A rack 22 is formed on the steered shaft 20. The rack 22 meshes with the pinion 13a of the steering shaft 13, and forms the rack-and-pinion mechanism, together with the pinion 13a. The maximum axial force that the rack-and-pinion mechanism can transmit between the steering shaft 13 and the steered shaft 20 is set according to the intended use of the steering system 10 or the like.

The steered shaft 20 also has a ball screw portion 23 at a position different from the rack 22. The ball screw portion 23 forms the ball screw device 40, together with a ball nut 21 to be described below (corresponding to a nut), and receives a steering assist force transmitted from the steering assist mechanism 30. The opposite ends of the steered shaft 20 are coupled to right and left steered wheels (not illustrated) via not-illustrated tie rods, knuckle arms, and so on, so that the steered wheels are steered in the right-left direction when the steered shaft 20 moves in the direction A.

The steering assist mechanism 30 is a mechanism that applies a steering assist force to the steered shaft 20 using the motor M as a drive source. The steering assist mechanism 30 includes the motor M, a control unit ECU that controls the motor M, and a drive force transmission mechanism 32. The motor M and the control unit ECU that drives the motor M are accommodated in a case 31 fixed to the first housing 11a of the housing 11. The control unit ECU determines steering assist torque, and controls the output of the motor M, on the basis of a signal output from the torque detection device 14.

Figure 2:
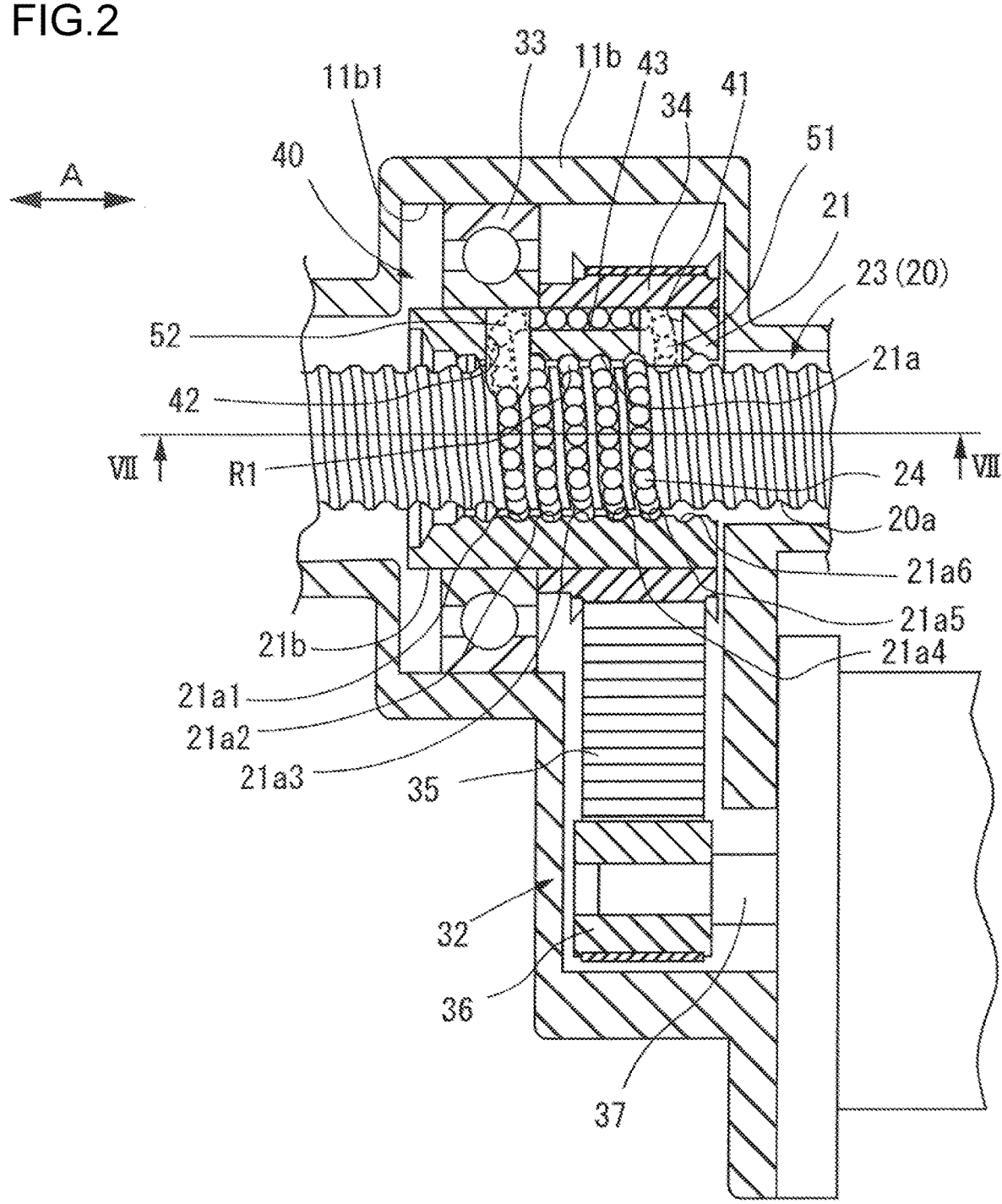
FIG. 2 is an enlarged cross-sectional view illustrating a steering assist mechanism and a ball screw device of FIG. 1 according to a first embodiment.

As illustrated in FIG. 2, the drive force transmission mechanism 32 includes a drive pulley 36, a driven pulley 34, and a toothed belt 35. The drive pulley 36 is attached to an output shaft 37 of the motor M. The output shaft 37 is disposed parallel to the axis of the steered shaft 20. The driven pulley 34 is disposed on the outer peripheral side of the ball nut 21 so as to be rotatable with the ball nut 21.

An end (left end in FIG. 2) of the ball nut 21 is rotatably supported on an inner peripheral surface 11b1 of the second housing 11b via a ball bearing 33. The toothed belt 35 extends around the drive pulley 36 and the driven pulley 34. The drive force transmission mechanism 32 transmits a rotational drive force generated by the motor M between the drive pulley 36 and the driven pulley 34, via the toothed belt 35.

As illustrated in FIG. 2, a major part of the ball screw device 40 is accommodated in the second housing 11b. The ball screw device 40 includes the steered shaft 20 (corresponding to a screw shaft), a ball screw portion 23 of the steered shaft 20, the ball nut 21 (corresponding to a nut), a plurality of rolling balls 24 (corresponding to rolling elements), and two deflectors 51 and 52. The ball screw portion 23 of the steered shaft 20 has an outer peripheral surface provided with a helical outer peripheral rolling groove 20a having multiple turns.

The ball nut 21 is formed in a tubular shape, and is disposed coaxially with the ball screw portion 23 (steered shaft 20) on the outer peripheral side of the ball screw portion 23. The ball nut 21 has an inner peripheral surface provided with a helical inner peripheral rolling groove 21a having multiple (N) turns. The outer peripheral rolling groove 20a of the ball screw portion 23 and the inner peripheral rolling groove 21a of the ball nut 21 are disposed to face each other.

A multi-row rolling path R1 in which the plurality of rolling balls 24 roll is defined between the outer peripheral rolling groove 20a and the inner peripheral rolling groove 21a. The plurality of rolling balls 24 are arranged in a rollable manner in the multi-row rolling path R1. Thus, the outer peripheral rolling groove 20a of the ball screw portion 23 (steered shaft 20) and the inner peripheral rolling groove 21a of the ball nut 21 are threadedly engaged with each other via the plurality of rolling balls 24.

Figure 3:
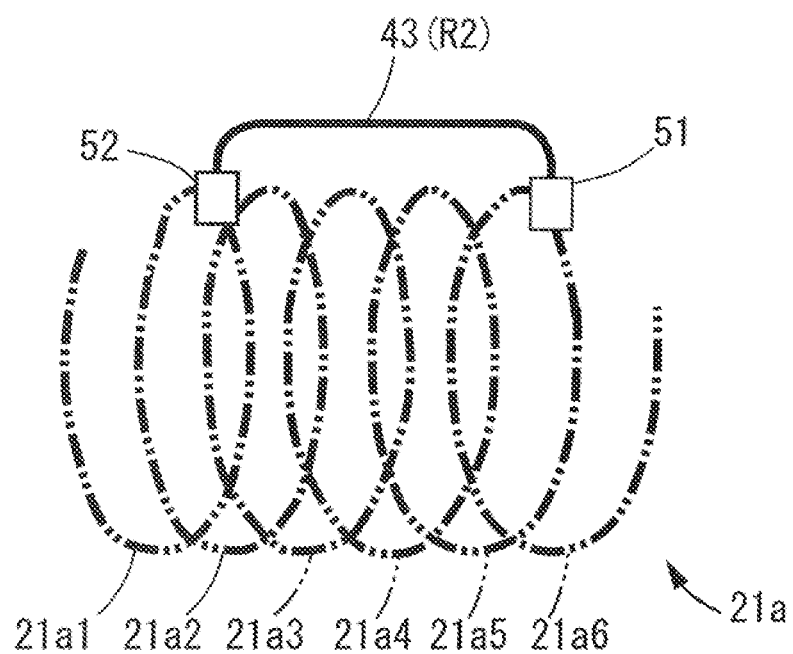
FIG. 3 illustrates the relationship between an inner peripheral rolling groove and deflectors.

As mentioned above, the ball nut 21 includes the inner peripheral rolling groove 21a having multiple (N) turns. As illustrated in FIG. 3, the inner peripheral rolling groove 21a includes single-turn rolling grooves 21a1 to 21aN (for example, 21a6) each having a single turn (360 degrees) around the axis along the direction A. That is, the inner peripheral rolling groove 21a is defined as a collection of the single-turn rolling grooves 21a1 to 21aN.

Figure 4:
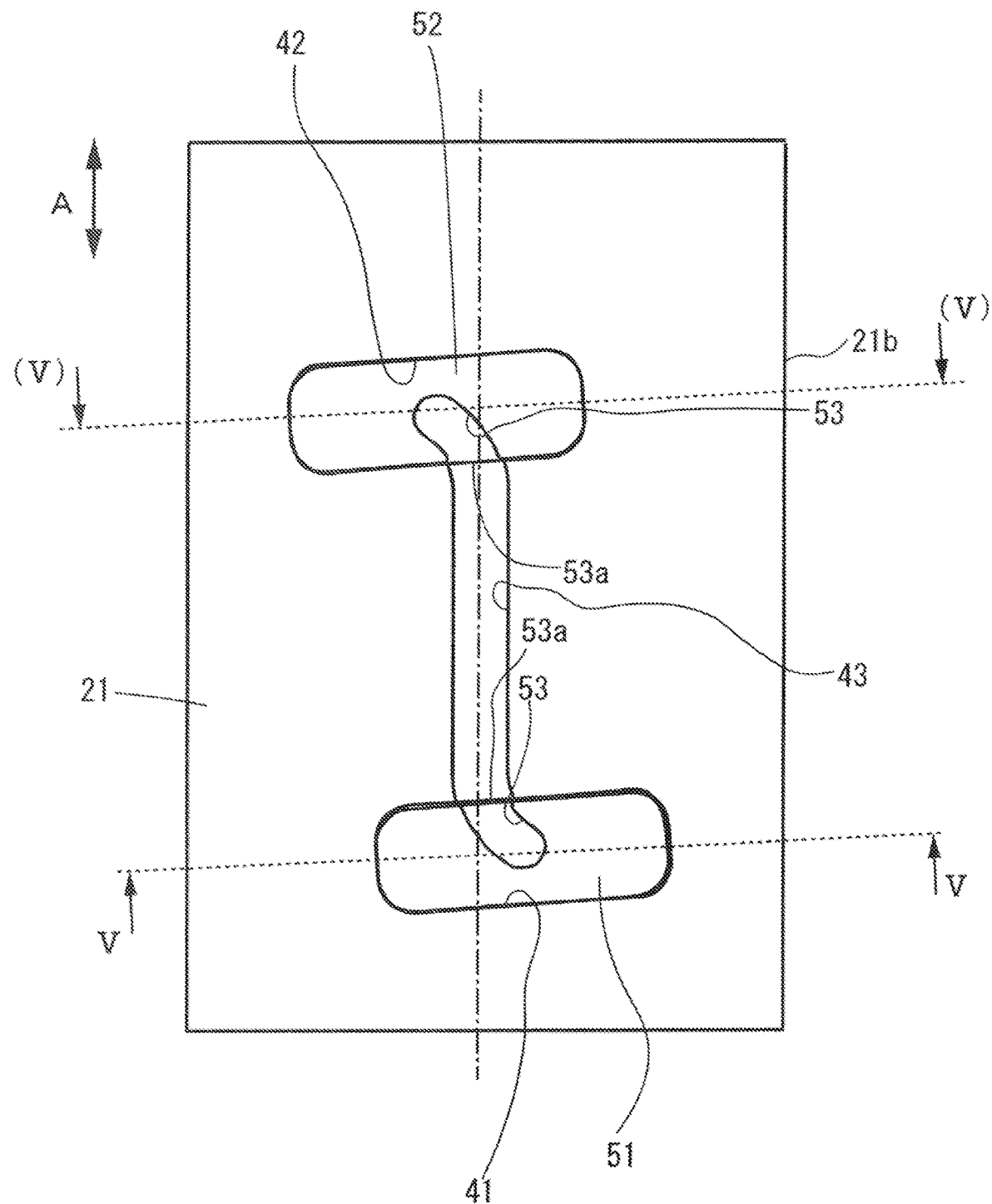
FIG. 4 illustrates the outer shape of a ball nut with the deflectors attached thereto.
Figure 5:
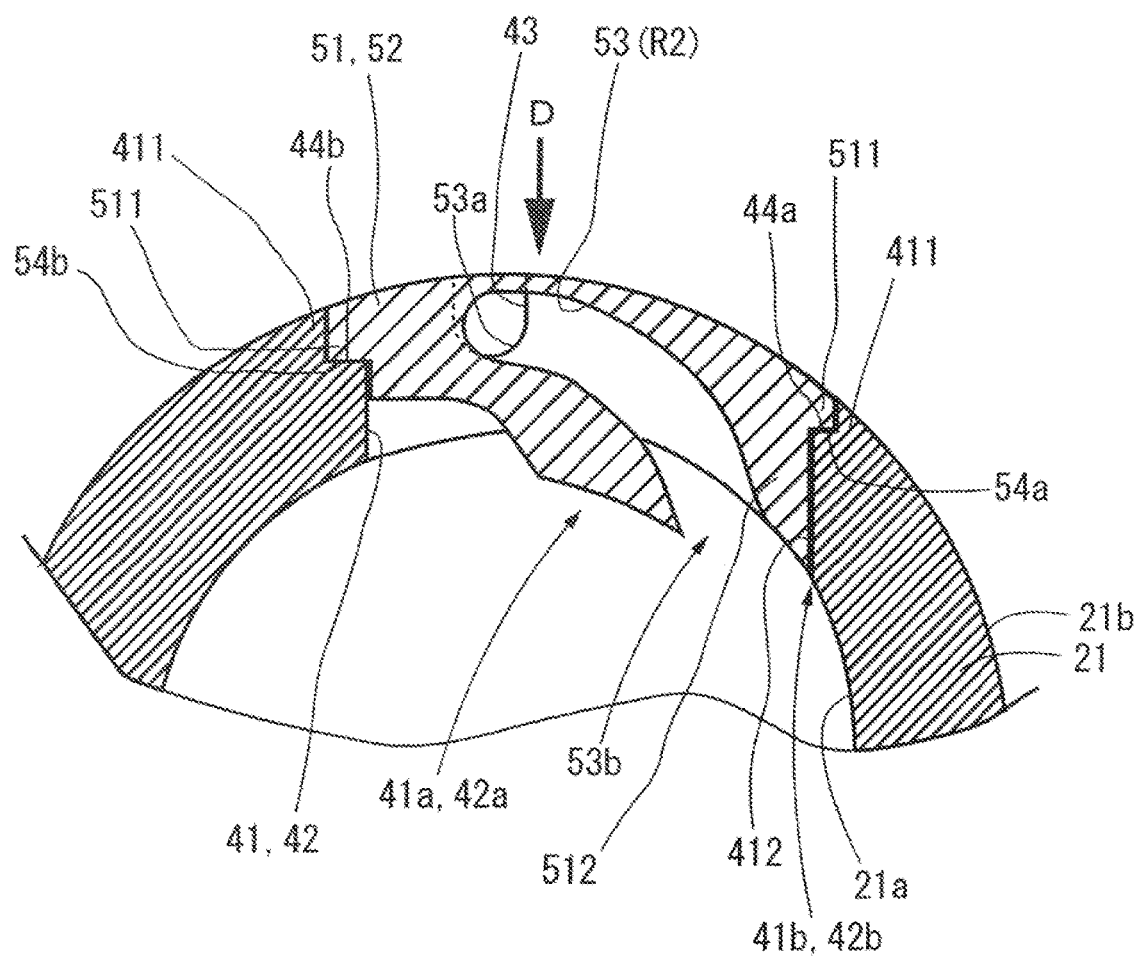
FIG. 5 is a cross-sectional view taken in the direction of the arrows V-V of FIG. 4.

The ball nut 21 includes a pair of (two) mounting holes 41 and 42 that extend between respective two different single-turn rolling grooves (for example, 21a1 and 21a6) of the single-turn rolling grooves 21a1 to 21aN aligned in the direction A (axial direction) and an outer peripheral surface 21b (see FIGS. 2, 4, and 5).

Note that the present invention is not limited to this aspect. As illustrated in FIG. 3, as long as the mounting holes 41 and 42 are spaced apart from each other by a plurality of single-turn rolling grooves of the inner peripheral rolling groove 21a of the ball nut 21, and are formed in respective two different single-turn rolling grooves, the mounting holes 41 and 42 may be formed to extend between any respective two different single-turn rolling grooves and the outer peripheral surface 21b. The shape of the inner peripheral rolling groove 21a will be described below in detail.

The mounting holes 41 and 42 extend so that openings 41a and 42a are open in the single-turn rolling groove 21a1 and the single-turn rolling groove 21a6 of the inner peripheral rolling groove 21a, respectively (see FIG. 5). Since the two mounting holes 41 and 42 have the same configuration, only the mounting hole 41 will be described. A direction D indicated by the arrow in FIG. 5 represents the direction in which the deflector 51 is inserted into the mounting hole 41 (hereinafter referred to simply as an "insertion direction D").

As illustrated in FIG. 5, the mounting hole 41 includes a press-fit hole portion 411, a guide hole portion 412, and two stopping faces 44a and 44b. An outer peripheral portion 511 of the deflector 51 to be described below is accommodated and press-fitted in the press-fit hole portion 411. An inner peripheral portion 512 of the deflector 51 to be described below is accommodated in the guide hole portion 412. The two stopping faces 44a and 44b abut against two stopped faces 54a and 54b of the deflector 51 to be described below in the insertion direction D, and position the deflector 51 in the insertion direction D, respectively.

The press-fit hole portion 411 is formed on the outer peripheral surface 21b side of the ball nut 21 in the radial direction of the ball nut 21. The press-fit hole portion 411 is a hole having a substantially rectangular shape (not illustrated) with rounded corners in a cross section orthogonal to the insertion direction D of the deflector 51.

In the present embodiment, the longitudinal direction of the substantially rectangular cross-sectional shape of the press-fit hole portion 411 is not orthogonal to the direction parallel to the end faces of the ball nut 21, that is, the axis of the ball nut 21. In the present embodiment, the longitudinal direction of the press-fit hole portion 411 is substantially parallel to the direction in which a projected groove extends. The projected groove is an imaginary groove that is formed by projecting the inner peripheral rolling groove 21a, which is formed in the inner peripheral surface of the ball nut 21, in a radially outwardly enlarged manner on the outer peripheral surface 21b.

The guide hole portion 412 extends through the inner peripheral surface of the ball nut 21. The guide hole portion 412 is a hole having a substantially rectangular shape (not illustrated) with rounded corners in a cross section orthogonal to the insertion direction D of the deflector 51. As illustrated in FIG. 5, the two stopping faces 44a and 44b are formed on different planes. However, the two stopping faces 44a and 44b may be formed on the same plane.

As illustrated in FIG. 4, the outer peripheral surface 21b of the ball nut 21 has a first return path 43 connected between the two mounting holes 41 and 42. The first return path 43 extends substantially in the axial direction of the ball nut 21 (direction A) and is open outward in the radial direction of the ball nut 21. The width of the opening of the first return path 43 is slightly greater than the diameter of the rolling balls 24. The bottom surface of the first return path 43 is a curved surface with a radius of curvature slightly greater than the radius of the rolling balls 24. This structure allows the rolling balls 24 to roll and reciprocate freely in the first return path 43.

Figure 6:
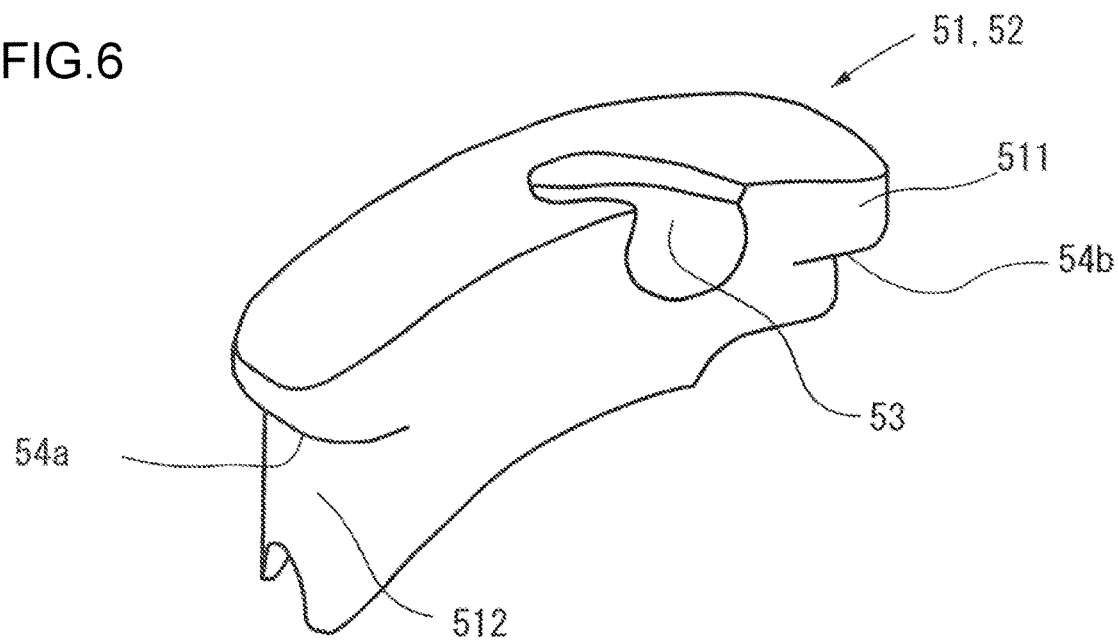
FIG. 6 is a perspective view illustrating the deflector of FIG. 4.

Next, the deflectors 51 and 52 will be described. FIG. 6 is a perspective view illustrating the two deflectors 51 and 52 accommodated in the two mounting holes 41 and 42. As illustrated in FIGS. 2 and 5, the two deflectors 51 and 52 are accommodated and fixed in the two mounting holes 41 and 42, respectively. Any method may be used to fix the deflectors 51 and 52.

Each of the two deflectors 51 and 52 has a second return path 53 as a through hole extending therethrough. When the two deflectors 51 and 52 are accommodated and fixed in the two mounting holes 41 and 42, respectively, first ends of the second return paths 53 and 53 are connected to the opposite ends of the first return path 43 of FIG. 4 to form first openings 53a. Further, second ends of the second return paths 53 and 53 are connected to the rolling path R1 to form second openings 53b (see FIG. 5). Note that the second openings 53b are open in the openings 41a and 42a of the mounting holes 41 and 42, respectively.

That is, the first return path 43 and the second return paths 53 and 53 form a return path R2 for returning the rolling balls 24. Thus, the second return paths 53 and 53 define a part of the return path R2. The return path R2 short-circuits between the openings 41a and 42a (that is, the second openings 53b) of the mounting holes 41 and 42 which are open to the rolling path R1 and are respectively formed in two different single-turn rolling grooves, namely, the single-turn rolling grooves 21a1 and 21a6.

With this configuration, the two deflectors 51 and 52 pick up the rolling balls 24 (rolling elements) from the multi-turn rolling path R1, guide (direct) the rolling balls 24 to the return path R2, and return (discharge) the rolling balls 24 to the multi-row rolling path R1. That is, the return path R2 including the two deflectors 51 and 52 allows the rolling balls 24 (rolling elements) rolling in the multi-row rolling path R1 to circulate endlessly. The ball screw device 40 of the first embodiment having this configuration is referred to as a "multi-row collective circulation ball screw device". The two deflectors 51 and 52 have the same shape, and have the same function. Therefore, only the structure of the deflector 51 will be described below.

As illustrated in FIGS. 5 and 6, the deflector 51 has the outer peripheral portion 511 and the inner peripheral portion 512 described above. The outer peripheral portion 511 is located at the outer peripheral portion of the ball nut 21 when the deflector 51 is accommodated and fixed in the mounting hole 41. The inner peripheral portion 512 is located closer to the inner peripheral rolling groove 21a than the outer peripheral portion 511 is when the deflector 51 is accommodated and fixed in the mounting hole 41.

The outer peripheral portion 511 has an outer shape similar to the cross-sectional outer shape of the press-fit hole portion 411 of the mounting hole 41, in a cross section orthogonal to the insertion direction D in FIG. 5. That is, the outer peripheral portion 511 has a substantially rectangular outer shape with rounded corners in a cross section orthogonal to the insertion direction D.

When the deflector 51 is accommodated in the mounting hole 41 of FIG. 5, the outer peripheral portion 511 is fitted (press-fitted) in the press-fit hole portion 411 of the mounting hole 41. Similar to the outer peripheral portion 511, the inner peripheral portion 512 has a substantially rectangular outer shape with rounded corners in a cross section orthogonal to the insertion direction D. The inner peripheral portion 512 is a portion that is guided by the guide hole portion 412 of the mounting hole 41, when the deflector 51 is inserted into the mounting hole 41 in the insertion direction D.

The two stopped faces 54a and 54b abut against the stopping faces 44a and 44b of the mounting hole 41 and restrict the position of the deflector 51 in the insertion direction D, when the deflector 51 is pushed in the insertion direction D and is press-fitted into the mounting hole 41.

As illustrated in FIG. 2, the ball bearing 33 and the driven pulley 34 are mounted on the outer peripheral surface 21b of the ball nut 21. When the ball bearing 33 and the driven pulley 34 are mounted, the open part of the first return path 43 on the outer peripheral surface 21b of the ball nut 21 is covered, and the deflectors 51 and 52 are prevented from coming off the two mounting holes 41 and 42, respectively. The ball bearing 33 supports the ball nut 21 such that the ball nut 21 is rotatable relative to the second housing 11b (housing 11).

Figure 7:
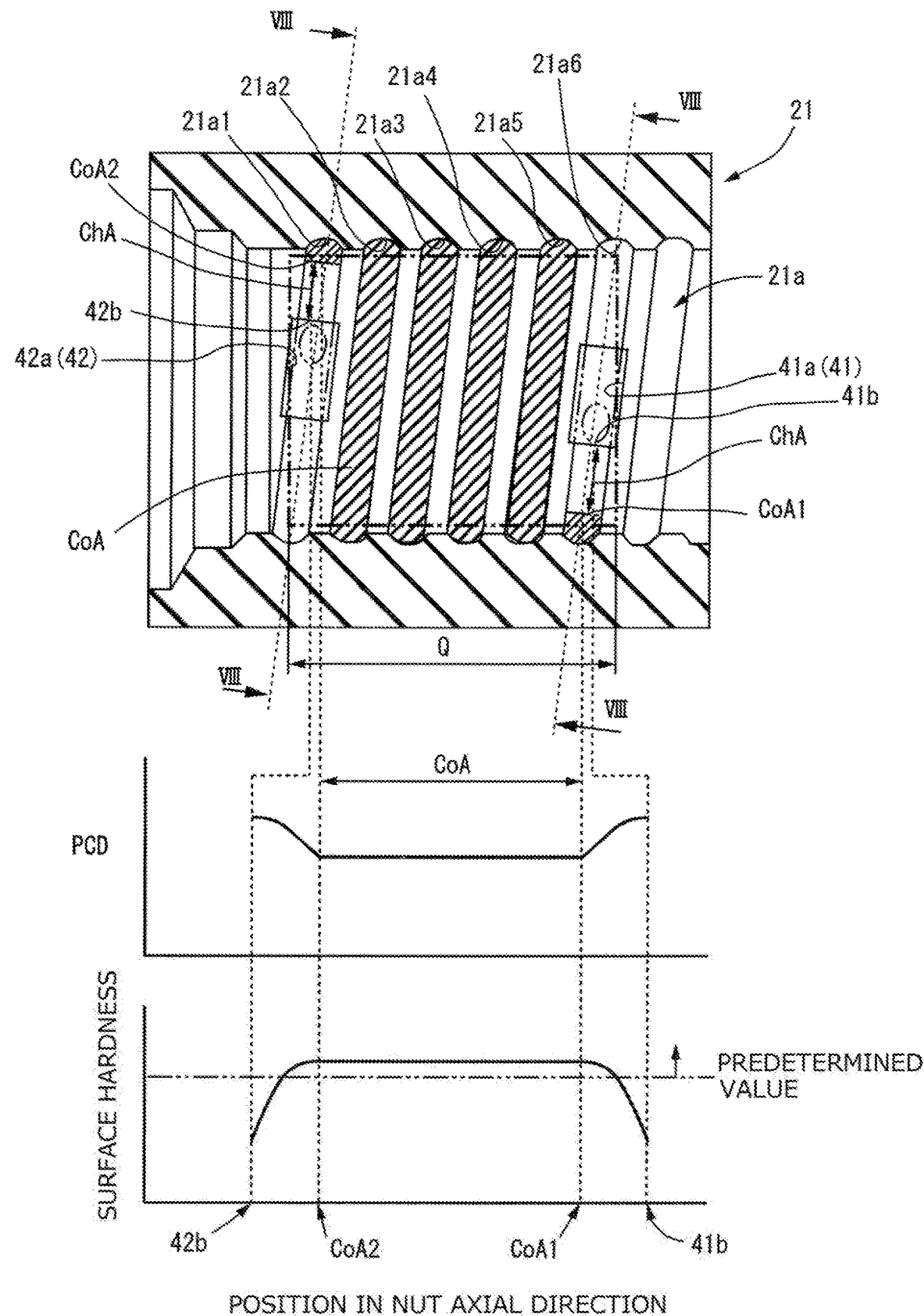
FIG. 7 illustrates a diagram and a graph for describing the inner peripheral rolling groove of the ball nut in detail.

Next, the shape of the inner peripheral rolling groove 21a of the ball nut 21 (nut) will be described in detail. As schematically illustrated in FIG. 7, the inner peripheral rolling groove 21a (single-turn rolling grooves 21a1 to 21aN) includes a constant pitch circle diameter region CoA (see the hatched area in FIG. 7, the graph of PCD—position in nut axial direction, and FIG. 8) in which the groove diameter of the inner peripheral rolling groove 21a is constant such that the pitch circle diameter (PCD) of the rolling path R1 is constant, in a range Q between the openings 41a and 42a of the mounting holes 41 and 42 (see the upper diagram in FIG. 7). The pitch circle diameter is determined in accordance with the groove diameter of the inner peripheral rolling groove 21a. The term "PCD" is well known, and will not be described in detail. In the following description, the pitch circle diameter may also be referred to simply as "PCD".

Figure 8:
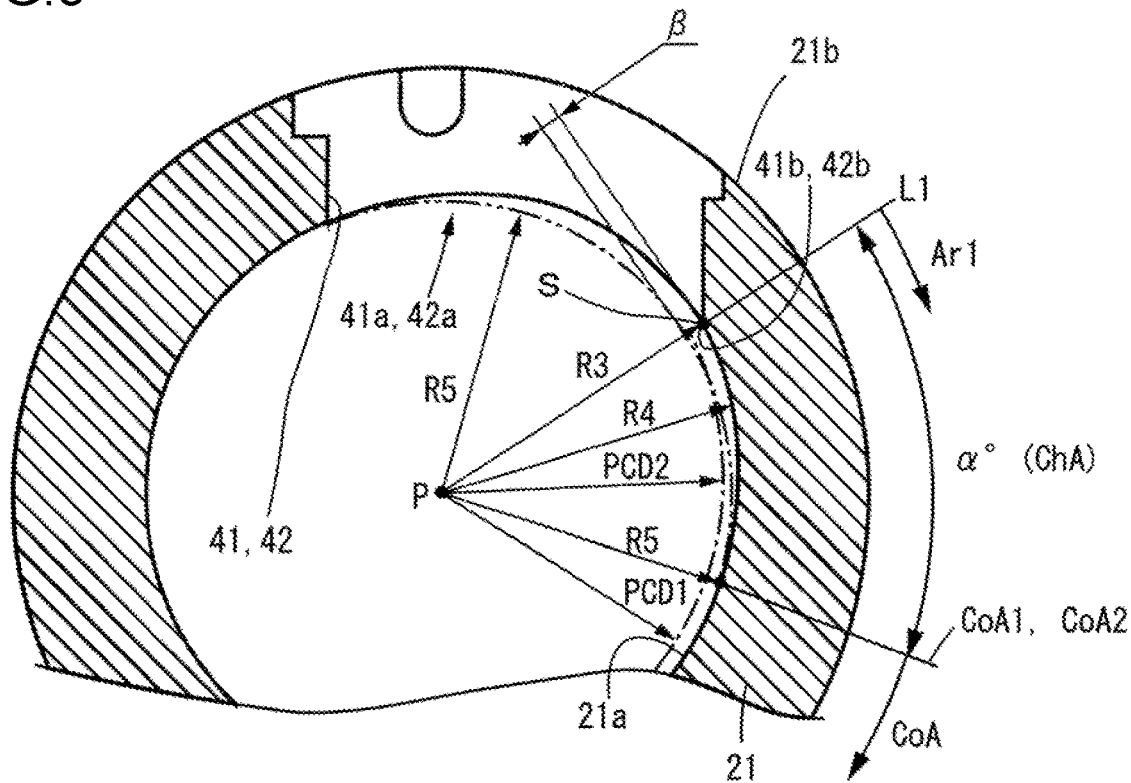
FIG. 8 is a cross-sectional view taken in the direction of the arrows VIII-VIII of FIG. 7.

As illustrated in FIGS. 7 and 8, the constant pitch circle diameter region CoA is disposed between positions CoA1 and CoA2 that are spaced apart by a predetermined amount in the direction in which the openings 41a and 42a face each other along the inner peripheral rolling groove 21a. The positions CoA1 and CoA2 are spaced apart by $\alpha°$ (a predetermined amount) in the circumferential direction (see the arrow Ar1 in FIG. 8) from the ends of the openings 41a and 42a, respectively (point S in FIG. 8). FIG. 8 is a diagram in which the deflectors 51 and 52 of FIG. 5 are not illustrated.

An example of a method of determining a reference position of the predetermined amount $\alpha°$ will be described. A groove radius R3 that is greater by a predetermined amount $\beta$ (for example, 20 to 500 μm) than a groove radius R5 of the inner peripheral rolling groove 21a determining the pitch circle radius PCD1 in the constant pitch circle diameter region CoA is specified as the point S (see FIG. 8) of the end of each of the openings 41a and 42a. The point S is the intersection between the plane of each of the mounting holes 41 and 42 (that is, the openings 41a and 42a) in the circumferential direction and the inner peripheral rolling groove 21a in the ball nut 21 (nut).

Then, an imaginary reference line L1 is formed by connecting the specified point S and the center point P of the inner peripheral rolling groove 21a. Then, the positions rotated about the center point P by $\alpha°$ in the circumferential direction with respect to the imaginary reference line L1 are calculated and determined as positions CoA1 and CoA2. In this case, $\alpha°$ may take any value. For example, $\alpha°$ may take various values, such as 5°, 30°, 60°, 90°, 180°, 360°, and 720°.

Further, as illustrated in FIG. 8, the inner peripheral rolling groove 21a includes gradually-changing pitch circle diameter regions ChA where the PCD gradually increases from the constant pitch circle diameter region CoA, in the ranges from positions CoA1 and CoA2 at the ends of the constant pitch circle diameter region CoA to the imaginary reference lines L1 of the respective openings 41a and 42a in the circumferential direction.

Accordingly, a groove radius R4 of the inner peripheral rolling groove 21a that determines the pitch circle radius PCD2 in the gradually-changing pitch circle diameter region ChA is formed to gradually increase from the groove radius R5 in the constant pitch circle diameter region CoA to the groove radius R3 that is set at the point S. The size of the groove radius R3 that is set at the point S may be arbitrarily set. Note that in the above description, the pitch circle radii PCD1 and PCD2 and the groove radii R3 to R5 may be expressed in diameter.

Further, as illustrated in FIG. 7, in the inner peripheral rolling groove 21a, the entire constant pitch circle diameter region CoA and a part of the gradually-changing pitch circle diameter regions ChA have a surface hardness greater than or equal to a predetermined value obtained through induction hardening. In this case, the surface hardness greater than or equal to the predetermined value is the hardness that provides sufficient durability to the inner peripheral rolling groove 21a even when the rolling balls 24 roll in the constant pitch circle diameter region CoA of the inner peripheral rolling groove 21a in the rolling path R1 and a stress is applied to the inner peripheral rolling groove 21a.

A part of the gradually-changing pitch circle diameter regions ChA is not limited to a specific range, and may be any range excluding edges 41b and 42b at the boundaries with the respective openings 41a and 42a and the inner peripheral rolling groove 21a. Further, the present invention is not limited to this aspect, and only the constant pitch circle diameter region CoA may have a surface hardness greater than or equal to a predetermined value through induction hardening while the gradually-changing pitch circle diameter regions ChA do not.

Further, in the present embodiment, the predetermined surface hardness is preferably based on Vickers hardness (Hv). Also, the Vickers hardness (Hv) is preferably greater than or equal to a predetermined value in the depth direction, in a predetermined depth range. The predetermined depth is a depth at which the inner peripheral rolling groove 21a can be provided with sufficient durability, and is obtained from experiments.

Next, induction hardening of the inner peripheral rolling groove 21a of the ball nut 21 (nut) as a method of manufacturing the ball nut 21 (ball screw device 40) will be described with reference to the schematic diagrams of FIGS. 7 and 9 and the flowchart of FIG. 10. Induction hardening is a well-known heat treatment method, and will not be described in detail.

In a first step S10, the ball nut 21 (nut) that has gone through the entire processing process is placed in a predetermined position. Then, in a second step S20, as illustrated in FIG. 9, a coil 45 is inserted and placed on the inner peripheral side of the ball nut 21 (nut). In the present embodiment, the coil 45 has a cylindrical shape at the axial center thereof, and has a different shape at each end thereof where at least the last turn is bent at a point substantially halfway around the circumference, as illustrated in FIG. 9.

Thus, the coil 45 is disposed such that the opposite ends having the different shape face the mounting holes 41 and 42. More specifically, opposite ends 45a of the coil 45 having the different shape are disposed spaced apart by a sufficient distance from the respective mounting holes 41 and 42. The sufficient distance is a distance sufficient to prevent the edges 41b and 42b where the mounting holes 41 and 42 and the inner peripheral rolling groove 21a meet from being heated even when a high-frequency current is applied to the coil 45. Note that at least the inner peripheral rolling groove 21a within the constant pitch circle diameter region CoA is disposed to face the cylindrical part of the coil 45 at the axial center thereof, in close proximity thereto.

In a third step S30, a high-frequency current is applied to the coil 45 to perform a heat treatment. Thus, a magnetic force due to electromagnetic induction is generated in the coil 45, and an eddy current is generated on the surface of at least the inner peripheral rolling groove 21a of the ball nut 21 within the constant pitch circle diameter region CoA, among the inner peripheral rolling groove 21a of the ball nut 21, due to the action of the generated magnetic force. Then, the inner peripheral rolling groove 21a is heated by the eddy current, and is transformed into an austenite phase.

However, the opposite ends 45a of the coil 45 facing the mounting holes 41 and 42 have the different shape, and are respectively apart by a great distance (space) from the openings 41a and 42a of the mounting holes 41 and 42. Therefore, although the edges 41b and 42b are present at the boundaries between the respective mounting holes 41 and 42 and the inner peripheral rolling groove 21a, the edges 41b and 42b are prevented from being overheated and melted due to concentration of the magnetic flux thereon.

Thereafter, in a fourth step S40, as an after-treatment of induction hardening, the inner peripheral rolling groove 21a in the austenite phase is rapidly cooled, and then tempered. In the case where a predetermined hardening depth is desired, the frequency of the current applied to the coil 45 is adjusted.

Thus, in the inner peripheral rolling groove 21a, at least the inner peripheral rolling groove 21a within the constant pitch circle diameter region CoA is formed to have a surface hardness greater than or equal to a predetermined value (see the lower graph in FIG. 7). Further, in the ball nut 21, the coil 45 is not disposed near the axial positions corresponding to the edges 41b and 42b at the boundaries between the respective openings 41a and 42a of the mounting holes 41 and 42 and the inner peripheral rolling groove 21a, so that the edges 41b and 42b are greatly spaced apart from the coil 45. Therefore, the amount of magnetic flux supplied from the coil 45 to the edges 41b and 42b is reduced, so that the edges 41b and 42b are prevented from being melted due to concentration of the magnetic flux thereon.

Figure 9:
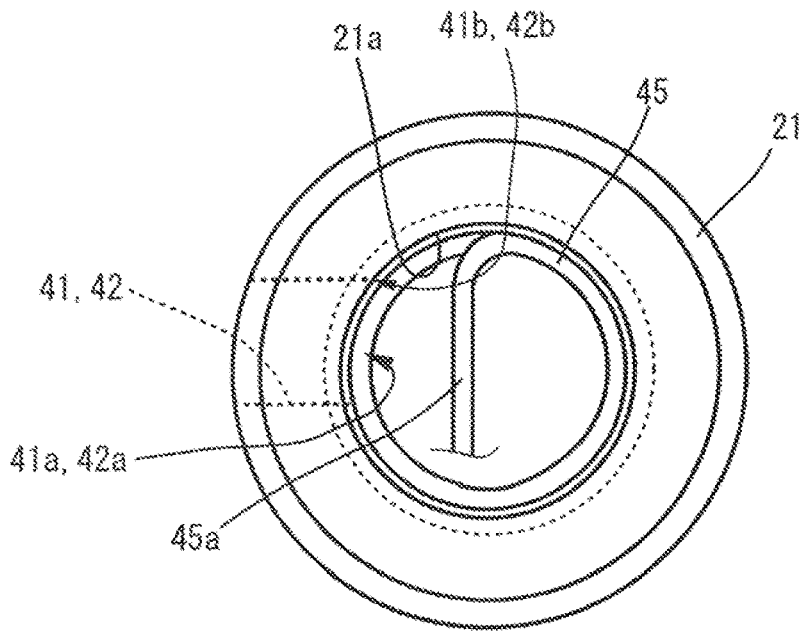
FIG. 9 illustrates the shape of a coil used when performing induction hardening for the inner peripheral rolling groove of the ball nut.
Figure 10:
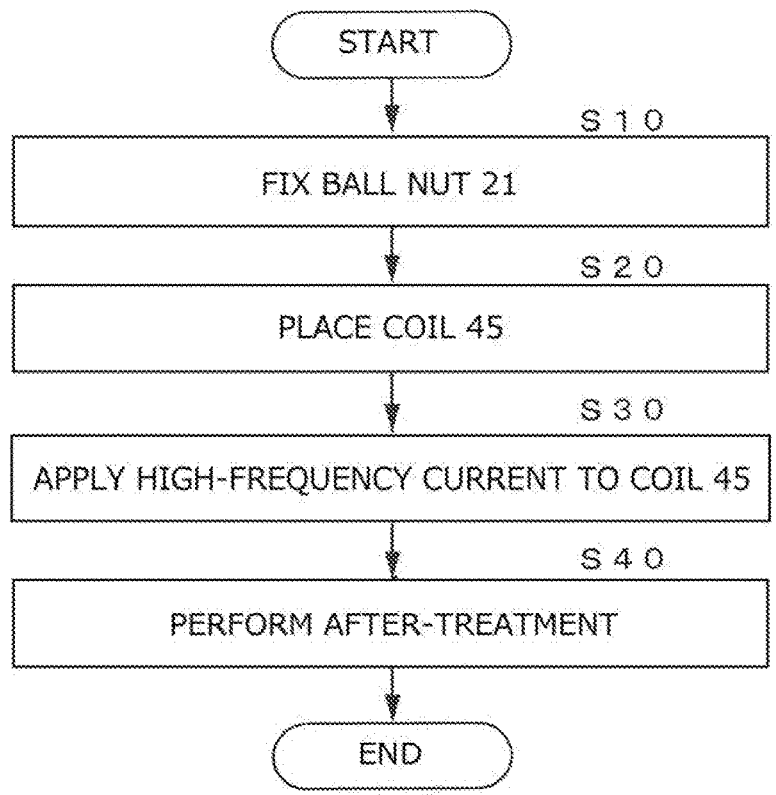
FIG. 10 is a flowchart illustrating a method of manufacturing the ball nut.

In the above embodiment, as illustrated in FIG. 9, in order to prevent the edges 41b and 42b at the boundaries between the respective openings 41a and 42a and the inner peripheral rolling groove 21a from being subjected to induction hardening, the opposite ends 45a of the coil 45 in the axial direction have a different shape so as to prevent the magnetic flux from concentrating at the edges 41b and 42b when a high-frequency current is applied to the coil 45.

However, the present invention is not limited to this aspect. In a modification, a coil (not illustrated) may be formed in a cylindrical shape, and may be disposed such that the opposite ends of the coil do not reach the mounting holes 41 and 42 in the axial direction, and thus do not face the edges 41b and 42b, respectively. Although this reduces the degree of freedom in setting the range of the constant pitch circle diameter region CoA, decent effects can be obtained. Further, the present invention is not limited to the above aspect, and the coil 45 may be formed in various other shapes so as to apply induction hardening to a greater part of the gradually-changing pitch circle diameter regions ChA, and to exclude only the edges 41b and 42b from the subject of induction hardening. Thus, the durability against rolling of the rolling balls 24 is further improved.

Next, a ball screw device according to a second embodiment will be described. In the first embodiment, the ball screw device 40 is a multi-row collective circulation ball screw device. However, the present invention is not limited thereto, and may be applied to a multi-row individual circulation ball screw device 140 (see FIG. 11) as the second embodiment. The multi-row individual circulation ball screw device 140 is of a well-known circulation type for a ball screw that is disclosed, for example, in Japanese Patent No. 5120040. Accordingly, a detailed description including operations will not be given, and only the differences from the ball nut 21 (*nut*) of the first embodiment will be described. In the following description, like elements are denoted by like reference numerals.

In the ball screw device 40 of the first embodiment, the two deflectors 51 and 52 provided in the ball nut 21 circulate the rolling balls 24 between the opposite ends of the ball nut 21. That is, the rolling balls 24 are circulated across the plurality of turns of the inner peripheral rolling groove 21*a* of the ball nut 21. Meanwhile, in the ball screw device 140, the rolling balls 24 are circulated between only two adjacent rolling grooves of the inner peripheral rolling groove 21*a* of the ball nut 21 having multiple (N) turns.

Figure 11:
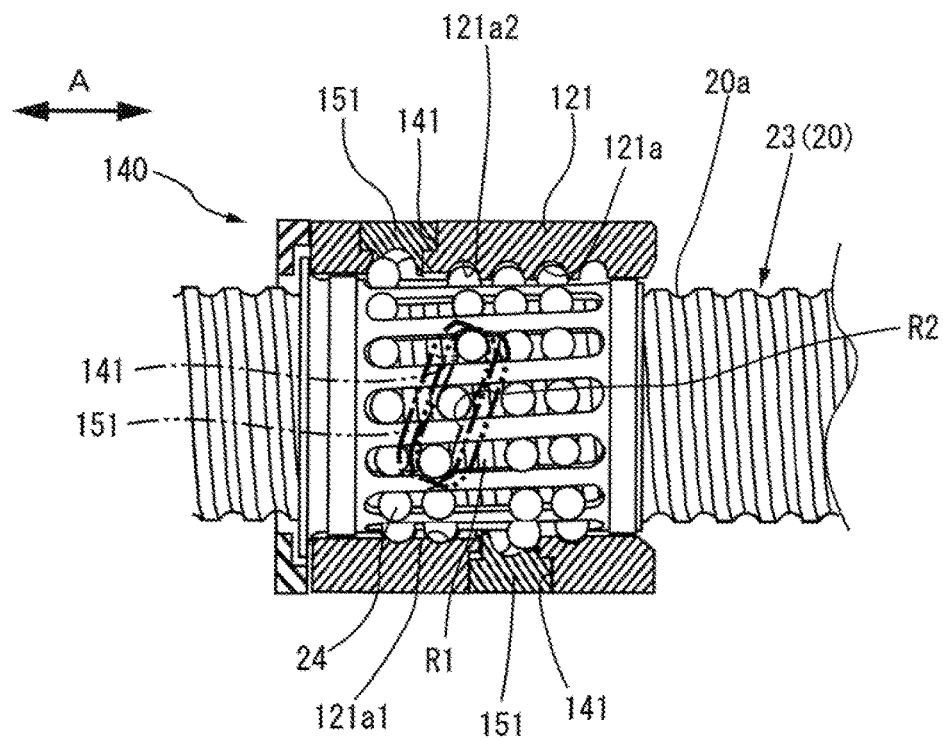
FIG. 11 is a diagram corresponding to FIG. 2, illustrating a ball screw device according to a second embodiment.

Accordingly, as illustrated in FIG. 11, in the case where an inner peripheral rolling groove 121*a* is defined as a collection of single-turn rolling grooves aligned in the axial direction and each having a single turn about the axis, a ball nut 121 of the second embodiment has a mounting hole 141 that extends between two adjacent different single-turn rolling grooves of the single-turn rolling grooves aligned in the axial direction and an outer peripheral surface 121*b*. That is, in the ball nut 121, since mounting holes are provided for two axially adjacent single-turn rolling grooves 121*a*1 and 121*a*2, for example, the respective openings are connected to each other, and it appears that one mounting hole 141 is formed to extend through.

Then, a deflector 151 is accommodated and fixed in the mounting hole 141. The deflector 151 defines the entire return path R2. The deflector 151 guides the rolling balls 24 (rolling elements) rolling in the rolling path R1 to the return path R2, and returns the rolling balls 24 to the rolling path R1. The return path R2 short-circuits between the openings of two single-turn rolling grooves that are open to the rolling path R1 so as to allow the rolling elements rolling in the rolling path R1 to circulate endlessly. Generally, a plurality of deflectors 151 are provided one for each of the different phases in the circumferential direction of the ball nut 121. However, in the following description, only one of the plurality of mounting holes 141 in which the deflectors 151 are mounted will be described.

Figure 12:
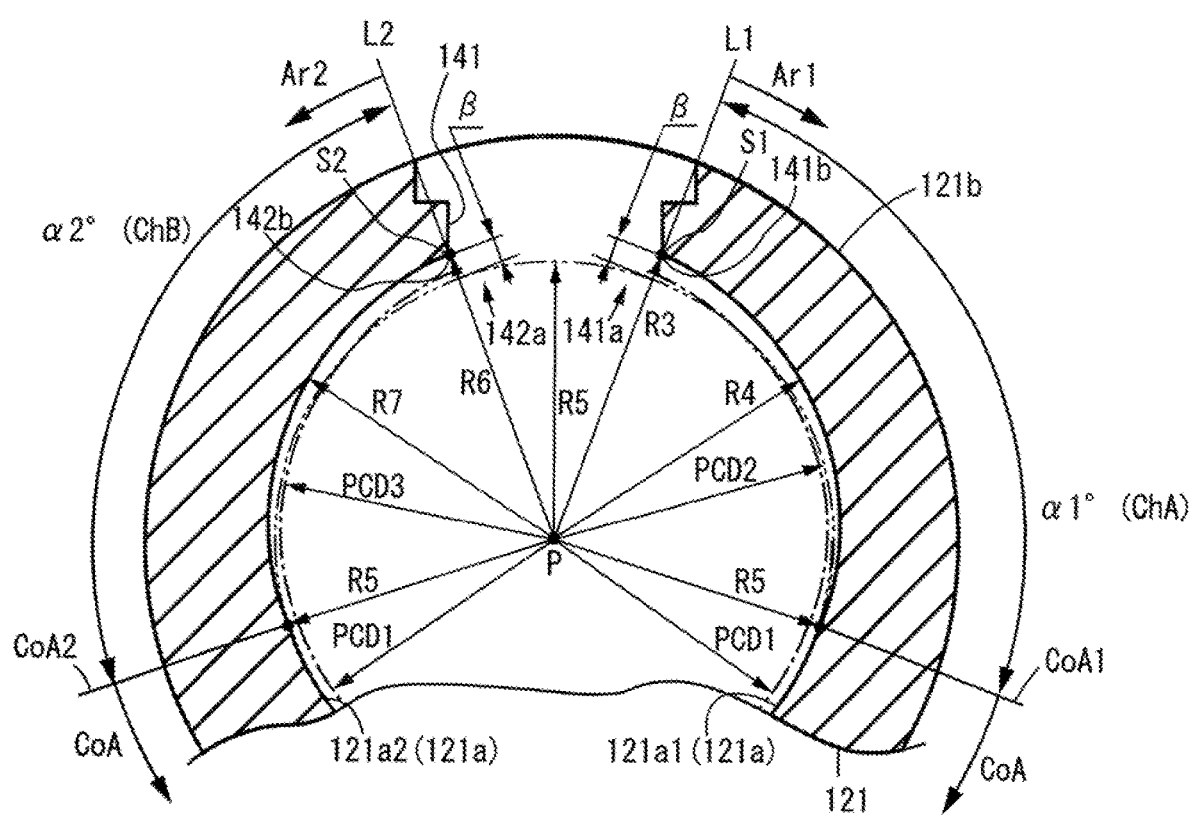
FIG. 12 is a diagram corresponding to FIG. 8, illustrating a ball nut according to the second embodiment.

As mentioned above, in the second embodiment, one mounting hole 141 is provided for two axially adjacent single-turn rolling grooves 121*a*1 and 121*a*2 to circulate the rolling balls 24 (rolling elements) between the two single-turn rolling grooves 121*a*1 and 121*a*2. Accordingly, unlike the first embodiment, each of the single-turn rolling grooves 121*a*1 and 121*a*2 of the ball nut 121 has gradually-changing pitch circle diameter regions ChA and ChB on the respective opposite sides of the mounting hole 141 as illustrated in FIG. 12. Note that FIG. 12 is a cross-sectional view corresponding to FIG. 8 of the first embodiment, illustrating the ball nut 121 of the second embodiment.

As illustrated in FIG. 12, the constant pitch circle diameter region CoA is disposed between positions CoA1 and CoA2 that are respectively spaced apart by a predetermined amount from the mounting hole 141 having openings 141*a* and 142*a* connected to each other along the opposite circumferential sides of the inner peripheral rolling groove 121*a* (single-turn rolling grooves 121*a*1 and 121*a*2). The positions CoA1 and CoA2 are spaced apart by $\alpha 1°$ and $\alpha 2°$ (a predetermined amount) in the circumferential direction (see the arrows Ar1 and Ar2 in FIG. 12) from the ends of the openings 141*a* and 142*a*, respectively (points S1 and S2 in FIG. 12). In this case, $\alpha 1°$ and $\alpha 2°$ may take any value. For example, $\alpha 1°$ and $\alpha 2°$ may take various values, such as 5°, 10°, 20°, 30°, and 40°. In the present embodiment, $\alpha 1°=\alpha 2°$.

Further, as mentioned above, the inner peripheral rolling groove 121*a* (single-turn rolling grooves 121*a*1 and 121*a*2) has gradually-changing pitch circle diameter regions ChA and ChB where the pitch circle radii PCD2 and PCD3 gradually increase from the constant pitch circle diameter region CoA, in the ranges from the positions CoA1 and CoA2 at the opposite ends of the constant pitch circle diameter region CoA to the respective openings 141*a* and 142*a* (imaginary reference lines L1 and L2) in the circumferential direction, as illustrated in FIG. 12. That is, the gradually-changing pitch circle diameter regions ChA and ChB are formed between the imaginary reference lines L1 and L2 and the positions CoA1 and CoA2, respectively. The pitch circle radius PCD2 and the pitch circle radius PCD3 in the gradually-changing pitch circle diameter regions ChA and ChB are equal.

In other words, groove radii R4 and R7 of the single-turn rolling grooves 121*a*1 and 121*a*2 that determine the gradually varying pitch circle radii PCD2 and PCD3 in the gradually-changing pitch circle diameter regions ChA and ChB gradually increase from a groove radius R5 that determines the constant pitch circle radius PCD1 in the constant pitch circle diameter region CoA to groove radii R3 and R6 that are set at the points S1 and S2. The groove radii R3 and R6 that are set at the points S1 and S2 may be arbitrarily set. Note that in the above description, the pitch circle radii PCD1 to PCD3 and the groove radii R3 to R7 may be expressed in diameter. The groove radius R4 and the groove radius R7 in the gradually-changing pitch circle diameter regions ChA and ChB are equal.

Further, in the single-turn rolling grooves 121*a*1 and 121*a*2, the entire constant pitch circle diameter region CoA and a part of the gradually-changing pitch circle diameter regions ChA and ChB have a surface hardness greater than or equal to a predetermined value obtained through induction hardening. In this case, the surface hardness greater than or equal to the predetermined value is the hardness that provides sufficient durability to the single-turn rolling grooves 121*a*1 and 121*a*2 even when the rolling balls 24 roll in the constant pitch circle diameter regions CoA of the single-turn rolling grooves 121*a*1 and 121*a*2 in the rolling path R1 and a stress is applied to the single-turn rolling grooves 121*a*1 and 121*a*2.

A part of the gradually-changing pitch circle diameter regions ChA and ChB is not limited to a specific range, and may be any range excluding edges 141*b* and 142*b* at the boundaries between the respective openings 141*a* and 142*a* and the single-turn rolling grooves 121*a*1 and 121*a*2. Further, the present invention is not limited to this aspect, and only the constant pitch circle diameter region CoA may have a surface hardness greater than or equal to a predetermined value through induction hardening while the gradually-changing pitch circle diameter regions ChA and ChB do not.

For performing induction hardening on the ball nut 121, it is preferable to change the shape of the coil 45 described in the first embodiment. That is, it is preferable to change the outside diameter shape of the coil so as to provide a sufficiently large distance between the plurality of mounting holes 141 disposed with their phases shifted in the circumferential direction of the ball nut 121. Thus, even when a high-frequency current is applied to the coil, concentration of the magnetic flux and the resulting overheating during induction hardening are prevented at the edges 141b and 142b of the ball nut 121, so that the ball nut 121 having the same functions and effects as the ball nut 21 of the first embodiment is formed.

Effects of the above embodiments will be described. According to the ball screw device 40 (140) of the above embodiments, the inner peripheral rolling groove 21a (121a) of the ball nut 21 (121) (nut) includes, in a range between the openings 41a and 42a (141a and 142a) of the mounting holes 41 and 42 (141), the constant pitch circle diameter region CoA spaced apart from the openings 41a and 42a (141a and 142a) and formed such that the pitch circle diameter PCD1 of the rolling path R1 is constant, and gradually-changing pitch circle diameter regions ChA (ChA and ChB) formed such that the pitch circle diameter PCD2 (PCD2 and PCD3) gradually increases from the constant pitch circle diameter region CoA, in ranges from the positions CoA1 and CoA2 at the opposite ends of the constant pitch circle diameter region to the respective openings 41a and 42a (141a and 142a). At least the constant pitch circle diameter region CoA has a surface hardness greater than or equal to a predetermined value obtained through induction hardening, among the constant pitch circle diameter region CoA and the gradually-changing pitch circle diameter regions ChA (ChA and ChB) excluding the edges 41b and 42b (141a and 142b) at the boundaries between the respective openings 41a and 42a (141a and 142a) and the inner peripheral rolling groove 21a (121a).

As described above, in the inner peripheral rolling groove 21a (121a) (rolling path R1), at least the constant pitch circle diameter region CoA to which a stress is applied by the rolling balls 24 (rolling elements) rolling therein has a surface hardness greater than or equal to a predetermined value obtained through induction hardening. Meanwhile, in the gradually-changing pitch circle diameter regions ChA (ChA and ChB) where a stress applied by the rolling balls 24 is reduced, the edges 41b and 42b (141b and 142b) at the boundaries between the respective openings 41a and 42a (141a and 142a) and the inner peripheral rolling groove 21a (121a) do not have a surface hardness greater than or equal to the predetermined value obtained through induction hardening, and have a surface hardness less than the predetermined value. That is, the hardening temperature is lower at the edges 41b and 42b (141b and 142b) than in the constant pitch circle diameter region CoA. With this configuration, in the constant pitch circle diameter region CoA of the inner peripheral rolling groove 21a (121a) to which a large stress is applied by the rolling balls 24 rolling therein, since the surface hardness greater than or equal to the predetermined value is obtained through an inexpensive induction hardening treatment, the inner peripheral rolling groove 21a (121a) is prevented from wearing, and has an improved durability.

In the gradually-changing pitch circle diameter regions ChA (ChA and ChB), a stress applied by the rolling balls 24 rolling therein is reduced. Therefore, even when an induction hardening treatment is not performed and the inner peripheral rolling groove 21a (121a) does not have a surface hardness greater than or equal to the predetermined value obtained through induction hardening, and has a surface hardness less than the predetermined value, the inner peripheral rolling groove can be prevented from wearing. Further, the hardening temperature is lower at the edges 41b and 42b (141b and 142b) at the boundaries between the respective openings 41a and 42a (141a and 142a) and the inner peripheral rolling groove 21a (121a) than in the constant pitch circle diameter region CoA. Therefore, concentration of the magnetic flux and the resulting overheating during induction hardening are prevented, so that erosion due to induction hardening is reliably prevented. In this manner, it is possible to manufacture a nut at low cost by appropriately performing inexpensive induction hardening (heat treatment) only on a portion that requires a surface hardness greater than or equal to a predetermined value, without using an expensive carburizing treatment. Further, induction hardening is performed by inserting the coil 45 into the inner peripheral side of the inner peripheral rolling groove 21a, and therefore is easily applicable in the case where one-piece flow for manufacturing nuts one by one is required.

Further, according to the above embodiments, in the inner peripheral rolling groove 21a (121a), the entire constant pitch circle diameter region CoA and a part of the gradually-changing pitch circle diameter regions ChA (ChA and ChB) have the surface hardness greater than or equal to the predetermined value. Thus, compared to the case where only the entire constant pitch circle diameter region CoA has a surface hardness greater than or equal to the predetermined value, the durability against the stress caused by the rolling motion of the rolling balls 24 can be further improved.

According to a method of manufacturing the ball screw device 40 (140) of the above embodiments, in the inner peripheral rolling groove 21a (121a), induction hardening is performed on at least the constant pitch circle diameter region CoA, among the constant pitch circle diameter region CoA and the gradually-changing pitch circle diameter regions ChA (ChA and ChB), excluding the edges 41b and 42b (141b and 142b) at the boundaries between the respective openings 41a and 42a (141a and 142a) and the inner peripheral rolling groove 21a (121a); and at least the constant pitch circle diameter region CoA is formed to have the surface hardness greater than or equal to the predetermined value through the induction hardening. Accordingly, it is possible to manufacture a ball screw device having the same effects as those of the ball screw device 40 (140).

Further, according to the above embodiments, the steering system 10 includes the ball screw device 40 (140) of the above embodiments. Thus, a low-cost, high durability steering system is obtained.

According to the first embodiment described above, the inner peripheral rolling groove 21a of the ball nut 21 (*nut*) includes the gradually-changing pitch circle diameter regions ChA, only in the range between the openings 41a and 42a of the mounting holes 41 and 42. However, the present invention is not limited to this aspect, and a gradually-changing pitch circle diameter region ChA may be provided also in the range on the side opposite to the range between the openings 41a and 42a. In the case where this configuration makes it easy to produce the inner peripheral rolling groove 21a, this achieves effects such as reduction in cost.

What is claimed is:
1. A ball screw device comprising:
a screw shaft having an outer peripheral surface provided with a helical outer peripheral rolling groove;
a nut formed in a tubular shape, the nut having an inner peripheral surface provided with a helical inner peripheral rolling groove, the nut being disposed on an outer peripheral side of the screw shaft, and the nut having a plurality of mounting holes extending between two different single-turn rolling grooves of single-turn rolling grooves aligned in an axial direction thereof and an outer peripheral surface thereof, the inner peripheral rolling groove being defined as a collection of the single-turn rolling grooves aligned in the axial direction and each having a single turn about an axis thereof;

rolling elements arranged in a rollable manner in a rolling path defined between the outer peripheral rolling groove and the inner peripheral rolling groove;

a return path that short-circuits between openings of the plurality of mounting holes that are open to the rolling path and are respectively formed in the two different single-turn rolling grooves, the return path allowing the rolling elements rolling in the rolling path to circulate endlessly; and a deflector accommodated and fixed in a mounting hole of the plurality of mounting holes, that defines a part of or the entire return path therein, the deflector being configured to guide the rolling elements rolling in the rolling path to the return path and return the rolling elements to the rolling path;

wherein:

the inner peripheral rolling groove of the nut includes, in a range between the openings of the mounting holes;

a constant pitch circle diameter region spaced apart from the openings and formed such that a pitch circle diameter of the rolling path is constant, and gradually-changing pitch circle diameter regions formed such that the pitch circle diameter gradually increases from the constant pitch circle diameter region in ranges from opposite ends of the constant pitch circle diameter region to the respective openings; and at least the constant pitch circle diameter region has a surface hardness greater than or equal to a predetermined value, among the constant pitch circle diameter region and the gradually-changing pitch circle diameter regions excluding edges at boundaries between the respective openings and the inner peripheral rolling groove, and the edges at the boundaries between the respective openings and the inner peripheral rolling groove have a surface hardness less than the predetermined value.

2. The ball screw device according to claim 1, wherein in the inner peripheral rolling groove, the entire constant pitch circle diameter region and a part of the gradually-changing pitch circle diameter regions have the surface hardness greater than or equal to the predetermined value.

3. The ball screw device according to claim 1, wherein the surface hardness greater than or equal to the predetermined value is obtained through an induction hardening operation.

4. A method of manufacturing the ball screw device of claim 1, wherein:

in the inner peripheral rolling groove, an induction hardening operation is performed on at least the constant pitch circle diameter region, among the constant pitch circle diameter region and the gradually-changing pitch circle diameter regions excluding the edges at the boundaries between the respective openings and the inner peripheral rolling groove; and at least the constant pitch circle diameter region is formed to have the surface hardness greater than or equal to the predetermined value through the induction hardening operation.

5. A steering system comprising the ball screw device of claim 1.

* * * * *